United States Patent
Tanpairoj et al.

(10) Patent No.: US 11,720,281 B2
(45) Date of Patent: Aug. 8, 2023

(54) STATUS INFORMATION RETRIEVAL FOR A MEMORY DEVICE

(71) Applicant: Micron Technology, Inc., Boise, ID (US)

(72) Inventors: Kulachet Tanpairoj, San Mateo, CA (US); Jonathan S. Parry, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 7 days.

(21) Appl. No.: 17/119,290

(22) Filed: Dec. 11, 2020

(65) Prior Publication Data

US 2022/0188025 A1 Jun. 16, 2022

(51) Int. Cl.
*G06F 3/06* (2006.01)

(52) U.S. Cl.
CPC .......... *G06F 3/0659* (2013.01); *G06F 3/0604* (2013.01); *G06F 3/0673* (2013.01)

(58) Field of Classification Search
CPC ..... G06F 3/0659; G06F 3/0604; G06F 3/0673
See application file for complete search history.

(56) References Cited

U.S. PATENT DOCUMENTS

| | | | | |
|---|---|---|---|---|
| 10,108,372 B2 * | 10/2018 | D'Eliseo | ............... | G06F 3/0659 |
| 10,141,034 B1 * | 11/2018 | Zitlaw | ................ | G11C 13/0061 |
| 10,222,989 B1 * | 3/2019 | Zitlaw | ................ | G11C 7/1015 |
| 2004/0199713 A1 * | 10/2004 | Roohparvar | ......... | G11C 7/1018 |
| | | | | 711/167 |
| 2015/0100744 A1 * | 4/2015 | Mirichigni | ............ | G06F 12/023 |
| | | | | 711/154 |
| 2017/0344302 A1 * | 11/2017 | Blicharski | ............. | G06F 3/0634 |
| 2019/0096446 A1 * | 3/2019 | Lee | ........................ | G11C 7/062 |
| 2020/0409597 A1 * | 12/2020 | Ganesh | ................ | G06F 3/0659 |

OTHER PUBLICATIONS

Blazorthon; "Memory controller integration;" Aug. 28, 2011; Tom's Hardware Forum; available at: https://forums.tomshardware.com/threads/memory-controller-integration.412285/ (Year: 2011).*
Burst mode (computing). (Apr. 20, 2020). In Wikipedia. https://web.archive.org/web/20200626230523/https://en.wikipedia.org/wiki/Burst_mode_(computing).*

* cited by examiner

*Primary Examiner* — Tracy A Warren
(74) *Attorney, Agent, or Firm* — Holland & Hart LLP (57) ABSTRACT

Methods, systems, and devices for status information retrieval for a memory device are described. In some examples, a memory device may include a set of status registers, each of which may be configured to store a corresponding set of status information. For example, at least some of the status registers may store status information for a corresponding portion of the memory device. The memory device may receive a command to output status information along with an indication of one or more particular status registers from which to output status information in response to the command. In response to the command and indication, the memory device may output status information from any quantity of status registers, including any type of status information, in a single stream or burst.

25 Claims, 6 Drawing Sheets

FIG. 6

US 11,720,281 B2

STATUS INFORMATION RETRIEVAL FOR A MEMORY DEVICE

FIELD OF TECHNOLOGY

The following relates generally to one or more systems for memory and more specifically to status information retrieval for a memory device.

BACKGROUND

Memory devices are widely used to store information in various electronic devices such as computers, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), 3-dimensional cross-point memory (3D cross point), not-or (NOR), and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Some memory systems may include multiple memory devices along with a memory system controller configured to manage the multiple memory devices. Such memory systems may in some cases be referred to as managed memory systems. For example, a system that includes multiple not-and (NAND) memory devices (e.g., dies including NAND memory cells, which may be referred to as NAND dies) and a memory system controller may be referred to as a managed NAND (mNAND) system. In some cases, the memory system controller may be configured to exchange signaling with a host device for the memory devices and exchange related signaling with the memory devices. For example, the host device may send commands to the memory system controller (e.g., read or write commands), and for at least some of these host-issued commands, the memory system controller may transmit corresponding commands to the memory devices (e.g., read, program, or erase commands). Thus, the memory devices may perform, in response to the commands issued by the memory system controller, various operations to satisfy the corresponding host-issued commands.

In some cases, a memory system controller may request that a memory device provide various types of status information. For example, the memory system controller may issue a command to a memory device, then later (e.g., after issuing one or more commands to one or more other memory devices) request that the memory device provide status information regarding the status of the operation commanded by the prior command (e.g., whether the operation was successful, unsuccessful, or remains pending). In some cases, the memory system controller may additionally or alternatively request one or more other types of status information, such as whether the memory device or a portion of the memory device is in a ready state or a busy state, or a temperature state for the memory device, or a power state for the memory device, among other examples.

Sets of status information (e.g., bytes of status information) may be stored at a memory device in corresponding status registers. In some cases, at least some status registers may be dedicated to (e.g., store status information specific to) a corresponding portion of the memory device, such as a corresponding plane of a memory array within the memory device or other addressable unit of memory within the memory device.

A command for a memory device to output status information may be referred to herein as a status command. In some memory systems, a memory system controller may have to issue (e.g., transmit) a separate status command to a memory device for each set of status information desired by the memory system controller. For example, the memory system controller may have to issue a first status command for the memory device to output a first set of status information from a first status register, a second status command for the memory device to output a second set of status information from a second status register, and so on. And in some cases, for each issued status command, the memory system controller may also have to issue an indication of a corresponding address, where the indicated address corresponds to a memory device (e.g., among multiple memory devices) or a portion of a memory device (e.g., a plane of an array within the memory device) for which the status information corresponding to the issued status command is desired. For example, to obtain status information for a first plane of a first memory device, the memory system controller may have to issue to the first memory device a status command and an address of the first memory device, the first plane, or both. Thus, in some cases, a memory system controller may have to issue both a command and an address for each status register from which the memory system controller desires status information. Additionally or alternatively, in some cases, a memory system controller may have to issue different types of status commands to obtain different types of status information (e.g., from different status registers storing different types of status information) from a memory device.

The use of a separate status command, or a separate combination of a status command and address, for each set of status information that a memory device is to output (e.g., each status register the contents of which the memory device is to output) may lead to undesired amounts of signaling overhead. For example, for each byte of status information desired by a memory system controller, the memory system controller may have to output both a status command and an address indication. Further, in some cases, status-related signaling may be exchanged between a memory system controller and a memory device over a same bus as data, and thus such signaling overhead may impact the throughput, latency, or both with which data is exchanged. Additionally or alternatively, the use of different types of status commands for different types of status information may introduce undesirable complexity and may also be unsustainable as memory devices increase in sophistication and additional types of status information become desired. Such signaling overhead and complexity problems may become further exacerbated with increases in the quantity of memory dies in a memory system, the throughput requirements for a memory system, or both.

As described herein, a single status command may be issued by a memory system controller to request that a memory device output multiple different sets of status information (e.g., from multiple different status registers). Additionally or alternatively, a single type of status command may be issued by a memory system controller to request that a memory device output multiple different types of status information. For example, the memory system controller may issue a single status command and a single indication of the status registers from which status information is to be output in response to the single status command. The indication of the status registers may indicate that a memory device is to output the contents of a single indicated status registers or multiple indicated status registers—including potentially the contents of all status registers of the memory device—in response to the single status command. Thus, multiple sets of status information from multiple status registers and potentially including multiple different types of status information may be streamed (e.g., output in immediate succession, as a single burst) by a memory device in response to a single status command and associated indication. The teachings herein thus may reduce signaling overhead, decrease the latency with which data is exchanged with a memory device, reduce system complexity, enhance system adaptability as new types of status information and status registers may be introduced, or any combination thereof, among other benefits that may be appreciated by one of ordinary skill in the art.

Though certain examples may be explained herein in the context of a memory system controller issuing status commands and exchanging related signaling with a memory device, it is to be understood that the teachings herein may also be applied in the context of a host device directly issuing status commands and exchanging related signaling with a memory device (e.g., may also be applied in the context of non-managed memory systems or devices). Also, though certain examples may be explained herein in the context of NAND memory devices, it is to be understood that the teachings herein may be extended to memory devices and memory systems including any type of memory cells.

Features of the disclosure are initially described in the context of a system as described with reference to FIG. 1. Features of the disclosure are described in the context of a timing diagram as described with reference to FIG. 2. These and other features of the disclosure are further illustrated by and described with reference to an apparatus diagram and flowcharts that relate to status information retrieval for a memory device as described with reference to FIGS. 3-6.

Figure 1:
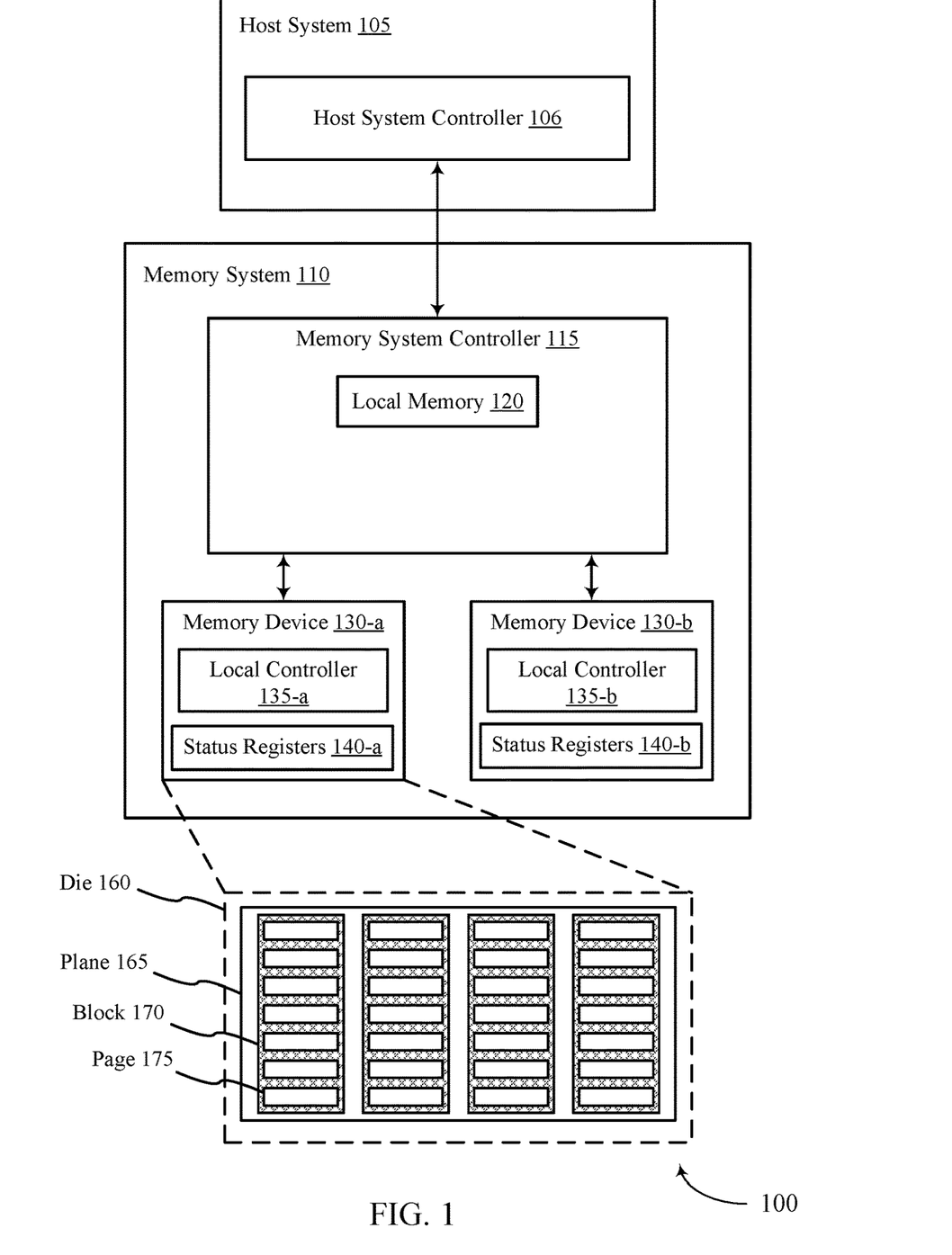
FIG. 1 illustrates an example of a system that supports status information retrieval for a memory device in accordance with examples as disclosed herein.

FIG. 1 is an example of a system 100 that supports status information retrieval for a memory device in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., PCIe controller, SATA controller). The host system 105 may use the memory system 110, for example, to write data to the memory system 110 and read data from the memory system 110. Although one memory system 110 is shown in FIG. 1, it is to be understood that the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a UFS interface, an eMMC interface, a peripheral component interconnect express (PCIe) interface, a serial advanced technology attachment (SATA) interface, a USB interface, a Fiber Channel interface, a Small Computer System Interface (SCSI), a Serial Attached SCSI (SAS), a Double Data Rate (DDR) interface, a dual in-line memory module (DIMM) interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

Memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, it is to be understood that memory system 110 may include any quantity of memory devices 130. Further, it is to be understood that where memory system 110 includes more than one memory device 130, different memory devices 130 within memory system 110 may include the same or different types of memory cells.

The memory system controller 115 may be coupled with and communicate with the host system 105 (e.g., via the physical host interface). The memory system controller 115 may include a control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130, and other such operations, which may generically be referred to as access operations. The memory system controller 115 may be coupled and exchange signaling with memory devices 130 via an interface using an associated protocol, where the protocol may be the same or different than the physical host interface. For example, the memory system controller 115 may exchange signaling with memory devices 130 using an ONFI protocol.

In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. And in some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 when read from or written to a memory device 130, and may be available within the local memory 120 for subsequent retrieval for or manipulation (e.g., updating) by the host system 105 (e.g., with reduced latency relative to a memory device 130) in accordance with a cache policy.

Although the example of memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may in some cases instead be performed by the host system 105, a local controller 135, or any combination thereof. In some cases, a memory device 130 that is managed at least in part by a memory system controller 115 may be referred to as a managed memory device. An example of a managed memory device is an mNAND device, which may be, for example, a UFS device, an eMMC device, a flash device, a USB flash device, a SD card, or a SSD, among other possibilities.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric RAM (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), and electrically erasable programmable ROM (EEPROM). Additionally or alternatively, a memory device 130 may include one or more arrays of volatile memory cells. For example, a memory device 130 may include random access memory (RAM) memory cells, such as dynamic RAM (DRAM) memory cells and synchronous DRAM (SDRAM) memory cells.

In some examples, a memory device 130 may include (e.g., on a same die or within a same package) a local controller 135, respectively, which may execute operations on one or more memory cells of the memory device 130. A local controller 135 may operate in conjunction with a memory system controller 115 or may perform one or more functions ascribed herein to the memory system controller 115.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, performing concurrent operations in different planes 165 may be subject to one or more restrictions, such as identical operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

Each memory device 130 may include a respective set of status registers 140, and each status register 140 may store a respective set of status information for the memory device 130. In some cases, at least some status registers 140 of a memory device may be dedicated to a respective portion of the memory device 130 (e.g., a respective plane 165 of the memory device 130) and may store a set of status information that includes at least some information specific to that respective portion of the memory device 130. For example, a status register 140 may store information regarding the status of a previously commanded operation (e.g., successful, failed, suspended, pending), whether the memory device 130 or a portion thereof (an array of the memory device 130, a cache of the memory device 130, or a plane 165 or other respective portion of the memory device 130) is in a ready or busy state, temperature information for the memory device 130 or a portion thereof, or power or voltage information for the memory device 130 or a portion thereof. In some cases, different status registers 140 may store different types of status information. Thus, for example, multiple status registers 140 may correspond to a same portion of a memory device 130 but store different types of status information for the portion of the memory device 130. Additionally or alternatively, some status registers 140 may store sets of status information specific to a corresponding portion of a memory device 130, while one or more other status registers 140 may store sets of status information application to the memory device 130 as a whole, among other possibilities that may be appreciated by one of ordinary skill in the art.

In some instances, the memory system controller 115 may request that a memory device 130 output status information. For example, the memory system controller 115 may transmit a status command to the memory device to check on the status of an operation corresponding to a command previously sent to the memory device 130 or to see if the memory device 130 or a portion thereof is ready for another command. Whether for these or any other number of reasons, the memory system controller 115 may transmit a status command to the memory device 130 along with an indication of the status information that the memory device 130 is to output in response to the status command. For example, the indication of the status information that the memory device 130 is to output in response to a status command may be an indication of one or more status registers 140 of the memory device 130, and the memory device 130 may transmit, to the memory system controller 115 in response to a single status command, the status information stored by any status register 140 included in the indicated set of one or more status registers 140.

The indication of one or more status registers 140 associated with a status command may indicate any quantity of status registers 140 for outputting status information—e.g., one status register 140, multiple status registers 140, or all of the status registers 140 of a memory device 130—and thus a memory device 130 may output any quantity of sets (e.g., bytes) of status information in response to a single status command.

The system 100 may include any quantity of non-transitory computer readable media that support status information retrieval for a memory device. For example, the host system 105, the memory system controller 115, or a memory device 130 may include or otherwise may access one or more non-transitory computer readable media storing instructions (e.g., firmware) for performing the functions ascribed herein to the host system 105, memory system controller 115, or memory device 130. For example, such instructions, when executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

As noted elsewhere, though certain examples may be described herein in the context of the memory system controller 115 transmitting a status command and associated indication of one or more status registers 140 to a memory device 130 and receiving, in response, one or more sets of status information, it is to be understood that in some cases a host system 105 may alternatively transmit a status command and associated indication of one or more status registers 140 to a memory device 130 and receive, in response, one or more sets of status information (e.g., in a system 100 that lacks a memory system controller 115).

Figure 2:
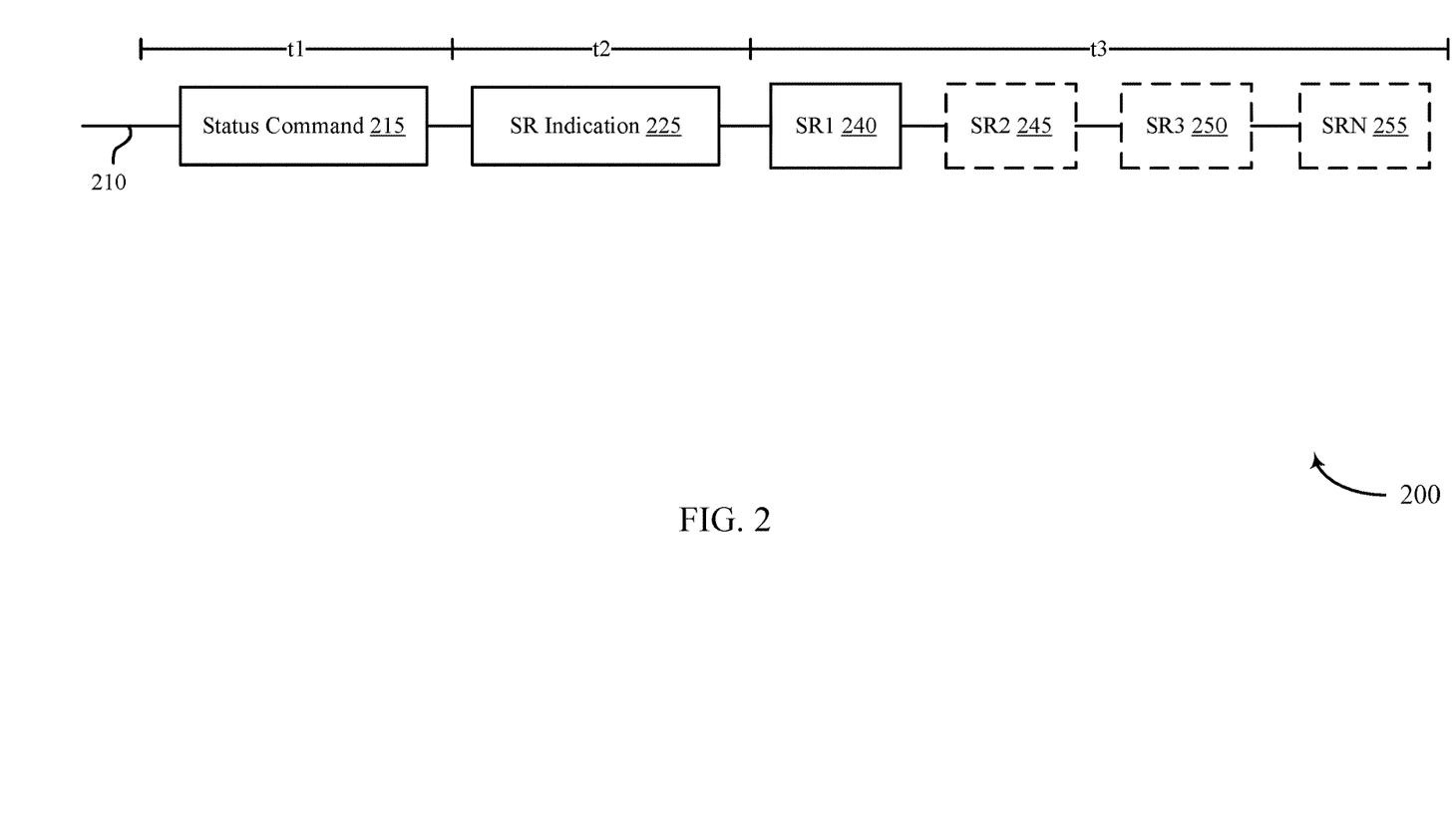
FIG. 2 illustrates an example of a timing diagram that supports status information retrieval for a memory device in accordance with examples as disclosed herein.

FIG. 2 is an example of a timing diagram 200 illustrating signaling that supports status information retrieval for a memory device in accordance with examples as disclosed herein. The timing diagram 200 may illustrate types of information that are communicated to and from a memory device. The example of FIG. 2 illustrates the information as being exchanged over a single bus 210, but it is to be understood that in other examples some of the information may alternatively be exchanged over one or more different buses. In some examples, the memory device may be an example of a memory device 130 as described with reference to FIG. 1. The memory device may exchange the signaling illustrated in the example of FIG. 2 with, for example, a memory system controller 115 as described with reference to FIG. 1 or a host system 105 as described with reference to FIG. 1.

During a first time period t1, the memory system controller or host system may transmit a status command 215 to the memory device via the bus 210. The status command 215 may instruct the memory device to output status information. In some instances, the status command 215 may not specify but instead may be generic with respect to the particular status registers from which the memory device is to output status information or a particular type of status information that the memory device is to output. A status register may be a status register 140 as described with reference to FIG. 1.

During a second time period t2, the memory system controller or host system may transmit an SR indication 225 to the memory device via the bus 210. The SR indication 225 may be associated with the status command 215 (e.g., based on a relative timing with which the status command 215 and SR indication 225 are received). The SR indication 225 may indicate which status register(s) from which the memory device 130 is to output status information in response to the status command 215. The SR indication 225 may indicate any quantity of status registers (e.g., one status register, multiple status registers, or all status registers) of the memory device. Though illustrated in the example of FIG. 2 as separate from and subsequent to the status command 215, it is to be understood that the SR indication 225 may alternatively be incorporated into (e.g., be a component of) the status command 215 in some examples.

During a third time period t3, the memory device may output status information to the memory system controller or host system via the bus 210. The status information, which may be output in a single stream (e.g., as a single burst), may include status information from the one or more status registers indicated by the SR indication 225. Thus, because the SR indication 225 may indicate any quantity of status registers of the memory device, the memory device may output during the third time period t3 status information from any quantity of status registers (e.g., any quantity 1 through N where the memory device may include N status registers) in response to the same status command 215 and SR indication 225. For instance, in the example illustrated in FIG. 2, SR1 240 may be status information from (e.g., stored by) a first status register indicated by the SR indication 225, SR2 245 may be status information from a second status register indicated by the SR indication 225, SR3 250 may be status information from a third status register indicated by the SR indication 225, and SRN 255 may be status information from an Nth status register indicated by the SR indication 225.

In some cases, the SR indication 225 may indicate a first status register (e.g., SR1 240) and a quantity of status registers. For example, each status register of a memory device may have a unique corresponding address (e.g., index). The address may, for example, be within an address space (e.g., set of indices) specific to status registers. The SR indication 225 may indicate the lowest-addressed status register of a set of one or more status registers along with a quantity of status registers (e.g., a quantity of any value 1 through N). The memory device may output status information from the status register having the indicated address along with status information from any successively addressed status register as necessary to yield the indicated quantity of status registers. Thus, for example, the memory device may output status information from the status register having the indicated address and no others if the indicated quantity is one, or the memory device may output status information from the status register having the indicated address and one or more others (e.g., one or more other status registers having incrementally greater or otherwise sequentially adjacent associated addresses or indices) if the indicated quantity is greater than one, including potentially all status registers of the memory device.

In some cases, the SR indication 225 may indicate (e.g., include) a numeric value that corresponds to a unique status register or unique combination of status registers. For example, an eight-bit SR indication 225 may be able indicate up to two-hundred and fifty-six (256) unique combinations of one or more specific status registers based on a mapping between the numeric value of the SR indication 225 and the corresponding unique combination of one or more specific status registers. A memory system controller or host system may indicate the numeric value to indicate with an SR indication 225 using a look-up table, and a memory device may identify the one or more status registers indicated by the SR indication 225 using a matching look-up table, for example. An example of a mapping between possible numeric values of an SR indication 225 and corresponding unique combinations of one or more specific status registers is shown below in Table 1.

TABLE 1

| Numeric Value | Status Register(s) |
|---|---|
| 0 | 0 |
| 1 | 1 |
| 2 | 2 |
| 3 | 1 and 2 |
| 4 | 4 |
| 5 | 4 and 0 |
| ... | ... |
| ... | ... |
| ... | ... |
| 255 | All Bytes |

For example, as shown in Table 1, a numeric value of zero (0) in the SR indication 225 may indicate that a memory device is to output a set of status information from a first status register having an address or index of zero (0), and a numeric value of one (1) in the SR indication 225 may indicate that a memory device is to output a set of status information from a second status register having an address or index of one (1). Additionally or alternatively, a numeric value of three (3) in the SR indication 225 may indicate that a memory device is to output a set of status information both the second status register having an address or index of one (1) and a third status register having an address or index of two (2). Any quantity of unique combinations of one or more status registers may be defined and mapped to (e.g., assigned) a corresponding numeric value for indication through an SR indication 225. In some cases, one numeric value (e.g., two-hundred and fifty-five (255) as shown in the example of Table 1, may indicate when included in an SR indication 225 that a memory device is to output the status information stored of each status register (that is, all the status registers) of the memory device in response to the associated status command 215.

In some cases, the SR indication 225 may indicate (e.g., include) a bitmap where each bit of the bit map may correspond to a respective status register of the memory device, and where the logic value of a bit may indicate whether the set of status information stored by the respective status register is to be output by the memory device in response to the associated status command 215. Thus, by setting one or more bits of the bitmap to a particular logic value (e.g., one (1)), the memory system controller or host device may indicate that the memory device is to output one or more sets of status information as stored by any quantity of one or more status registers. For example, if all bits of the SR indication 225 are set to the particular logic value, the memory device may output the status information stored of each status register (that is, all the status registers) of the memory device in response to the associated status command 215.

As described herein, status information from any quantity of status registers may be output by a memory device in response to a single status command 215 and associated SR indication 225 in a single burst (e.g., with no intervening signaling, for example). This or other features described herein may reduce the overhead (e.g., quantity) of signaling via the bus 210 associated with status information reporting by a memory device. Additionally or alternatively, this or other features described herein may enhance the availability of the bus 210 or other resources (e.g., processing resources of the memory device, memory system controller, or host system) to exchange other signaling, such as data, which may provide throughput benefits, latency benefits, or both. Additionally or alternatively, this or other features described herein may reduce on overall complexity of the system by eliminating a need for separate types of status commands for different types of status information, may improve the adaptability of a system to future increases in the quantity or types of status information stored by a memory device, or any combination thereof. One of ordinary skill in the art may appreciate further benefits.

In some instances, a memory system controller or host system may transmit a status command 215 and associated SR indication 225 to a memory device based on having transmitted one or more prior commands, such as access (e.g., read, write, or erase) commands to the memory device. For example, during some time period before t1, memory system controller or host system may have transmitted a command for the memory device to perform an operation (e.g., access operation), and the memory system controller or host system may transmit the status command 215 and associated SR indication 225 to check on the status of the operation, an availability or other status of the memory device 130 or a portion thereof for a subsequent (e.g., to-be-commanded) operation, or any combination thereof.

Figure 3:
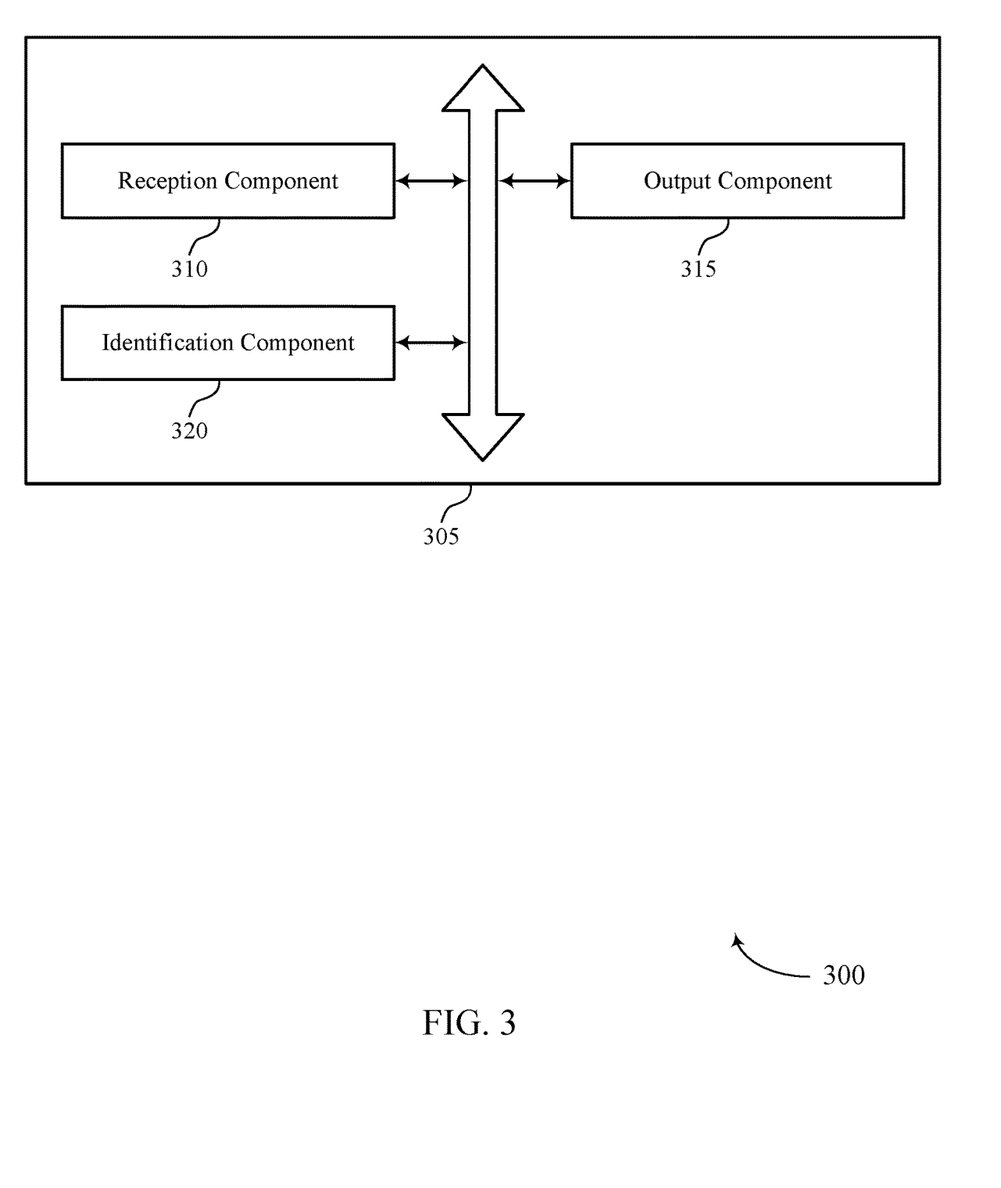
FIG. 3 shows a block diagram of a memory device that supports status information retrieval for a memory device in accordance with aspects of the present disclosure.

FIG. 3 shows a block diagram 300 of a memory device 305 that supports status information retrieval for a memory device in accordance with examples as disclosed herein. The memory device 305 may be an example of aspects of a memory device as described with reference to FIGS. 1 and 2. The memory device 305 may include a reception component 310, an output component 315, and an identification component 320. Each of these modules may communicate, directly or indirectly, with one another (e.g., via one or more buses).

The reception component 310 may receive a command to output status information associated with a memory device. In some examples, the reception component 310 may receive an indication of one or more status registers of the set of status registers.

The output component 315 may output, in response to the command and the indication of the one or more status registers, one or more sets of status information corresponding to the one or more status registers.

In some examples, the indication may indicate a plurality of status registers of the set of status registers, and the output component 315 may output corresponding sets of status information for the plurality of status registers in response to the command and the indication.

In some examples, the indication may indicate all status registers of the set of status registers, and the output component 315 may output corresponding sets of status information for each status register of the set of status registers in response to the command and the indication.

In some examples, the indication may indicate a first status register of the set of status registers and a quantity of status registers, and the output component 315 may output, in response to the command and the indication, the corresponding set of status information for each status register of the quantity of status registers equal to the indicated quantity, the quantity of status registers including the first status register.

In some examples, the indication may indicate a numeric value of a set of numeric values, and the identification component 320 may identify the one or more status registers based on a mapping between the set of numeric values and the set of status registers.

In some cases, each status register of the set of status registers is associated with a respective address within an address space specific to the set of status registers, and where the quantity of status registers corresponds to the first status register and one or more status registers each having an address subsequent to an address of the first status register. In some cases, the indication of the one or more status registers includes a bitmap, each bit of the bitmap corresponding to a respective status register of the set of status registers and indicating whether the memory device is to output the corresponding status information for the respective status register. In some cases, a status register of the set of status registers corresponds to a respective portion of a memory array within the memory device, and the corresponding set of status information for the status register includes a set of bits that each indicate a different type of status information associated with the respective portion of the memory array.

In some cases, each status register of at least a subset of the set of status registers is associated with a respective plane of a memory array within the memory device. In some cases, a set of status information included in the one or more sets of status information indicates whether an operation by the memory device failed or was successfully completed, whether the memory device or a portion of the memory device is idle or busy, temperature information for the memory device or a portion of the memory device, power or voltage information for the memory device or a portion of the memory device, or any combination thereof. In some cases, the set of status registers and a memory array within the memory device are on a same die.

Figure 4:
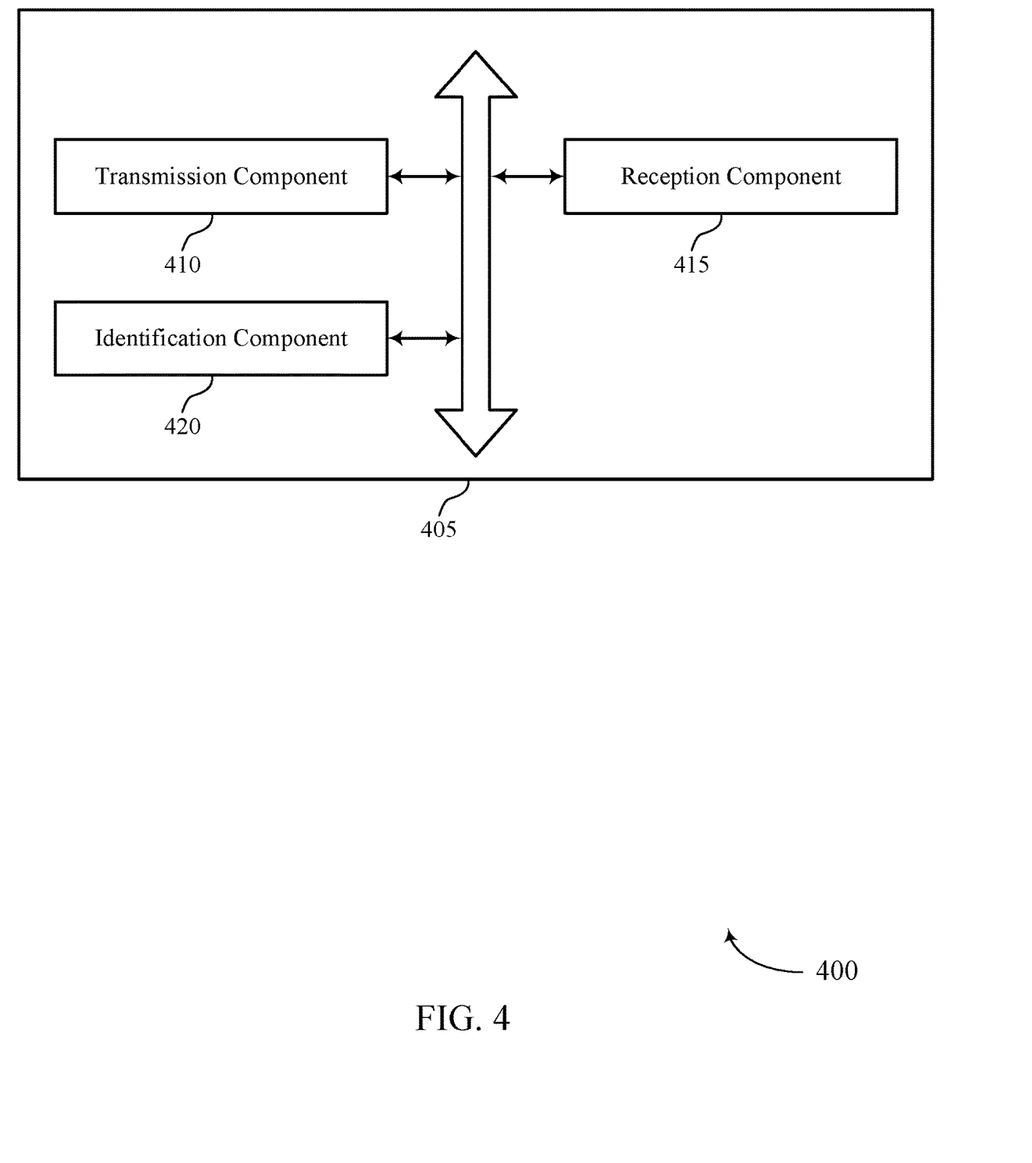
FIG. 4 shows a block diagram of a device that supports status information retrieval for a memory device in accordance with aspects of the present disclosure.

FIG. 4 shows a block diagram 400 of a device 405 that supports status information retrieval for a memory device in accordance with examples as disclosed herein.

The device 405 may be an example of aspects of a host device as described with reference to FIGS. 1 and 2, or may be an example of a controller located within a mNAND device as described with reference to FIGS. 1 and 2. The device 405 may include a transmission component 410, a reception component 415, and an identification component 420. Each of these modules may communicate, directly or indirectly, with one another (e.g., via one or more buses).

The transmission component 410 may transmit, to a memory device, a command for the memory device to output status information associated with the memory device. In some examples, the transmission component 410 may transmit, to the memory device, an indication of one or more status registers of a set of status registers associated with the memory device, each status register of the set of status registers associated with a corresponding set of status information for the memory device.

The reception component 415 may receive, from the memory device in response to the command and the indication of the one or more status registers, one or more sets of status information corresponding to the one or more status registers.

In some examples, the indication may indicate all status registers of the set of status registers, and the reception component 415 may receive corresponding sets of status information for each status register of the set of status registers in response to the command and the indication.

In some examples, the indication may indicate a first status register of the set of status registers and a quantity of status registers, and the reception component 415 may receive, in response to the command and the indication, the corresponding set of status information for each status register of the quantity of status registers equal to the indicated quantity, the quantity of status registers including the first status register.

The identification component 420 may identify a numeric value of a set of numeric values based on a mapping between the set of numeric values and the set of status registers, where the indication of the one or more status registers includes the numeric value.

In some cases, each status register of the set of status registers is associated with a respective address within an address space specific to the set of status registers, and the quantity of status registers corresponds to the first status register and one or more status registers each having an address subsequent to an address of the first status register. In some cases, the indication of the one or more status registers includes a bitmap, each bit of the bitmap corresponding to a respective status register of the set of status registers and indicating whether the memory device is to output the corresponding status information for the respective status register. In some cases, a set of status information included in the one or more sets of status information indicates whether an operation by the memory device failed or was successfully completed, whether the memory device or a portion of the memory device is idle or busy, temperature information for the memory device or a portion of the memory device, power or voltage information for the memory device or a portion of the memory device, or any combination thereof.

In some examples, the memory device is on a first die within the apparatus; and the controller is on a second die within the apparatus. In some examples, the controller is coupled with the memory device via a first interface, the controller is configured to be coupled with a host device for the memory device via a second interface, and the controller is configured to receive commands for the memory device from the host device via the second interface.

Figure 5:
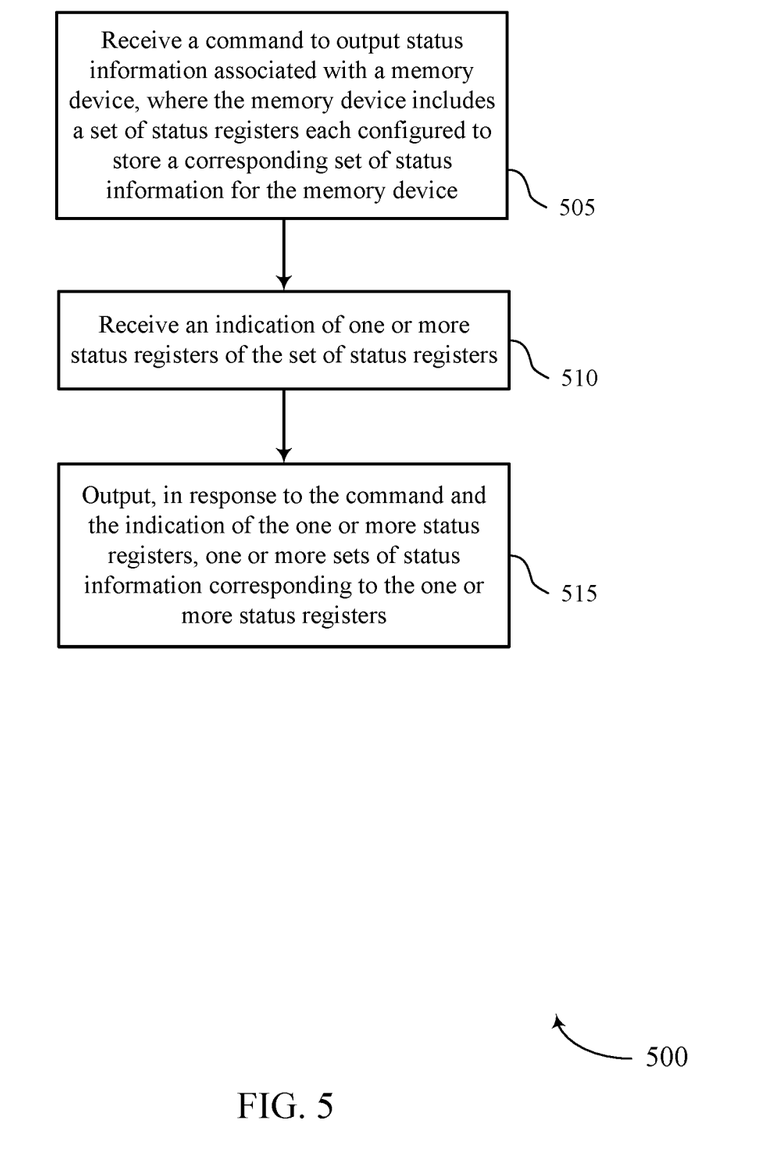
FIGS. 5 and 6 show flowcharts illustrating a method or methods that support status information retrieval for a memory device in accordance with examples as disclosed herein.

FIG. 5 shows a flowchart illustrating a method or methods 500 that supports status information retrieval for a memory device in accordance with aspects of the present disclosure. The operations of method 500 may be implemented by a memory device or its components as described herein. For example, the operations of method 500 may be performed by a memory device as described with reference to FIG. 3. In some examples, a memory device may execute a set of instructions to control the functional elements of the memory device to perform the described functions. Additionally or alternatively, a memory device may perform aspects of the described functions using special-purpose hardware.

At 505, a command to output status information associated with a memory device may be received by the memory device, where the memory device includes a set of status registers each configured to store a corresponding set of status information for the memory device. The operations of 505 may be performed according to the methods described herein. In some examples, aspects of the operations of 505 may be performed by a reception component as described with reference to FIG. 3.

At 510, an indication of one or more status registers of the set of status registers may be received by the memory device. The operations of 510 may be performed according to the methods described herein. In some examples, aspects of the operations of 510 may be performed by a reception component as described with reference to FIG. 3.

At 515, one or more sets of status information corresponding to the one or more status registers may be output from the memory device in response to the command and the indication of the one or more status registers. The operations of 515 may be performed according to the methods described herein. In some examples, aspects of the operations of 515 may be performed by an output component as described with reference to FIG. 3.

In some examples, an apparatus as described herein may perform a method or methods, such as the method 500. The apparatus may include features, means, or instructions (e.g., a non-transitory computer-readable medium storing instructions executable by a processor) for receiving a command to output status information associated with a memory device where the memory device includes a set of status registers each configured to store a corresponding set of status information for the memory device, receiving an indication of one or more status registers of the set of status registers, and outputting, in response to the command and the indication of the one or more status registers, one or more sets of status information corresponding to the one or more status registers.

In some examples of the method 500 and the apparatus described herein, the indication indicates a set of status registers of the set of status registers, and the operations, features, means, or instructions for outputting the one or more sets of stats information may include operations, features, means, or instructions for outputting corresponding sets of status information for the set of status registers in response to the command and the indication.

In some examples of the method 500 and the apparatus described herein, the indication indicates all status registers of the set of status registers, and the operations, features, means, or instructions for outputting the one or more sets of stats information may include operations, features, means, or instructions for outputting corresponding sets of status information for each status register of the set of status registers in response to the command and the indication.

In some examples of the method 500 and the apparatus described herein, the indication indicates a first status register of the set of status registers and a quantity of status registers, and the operations, features, means, or instructions for outputting the one or more sets of stats information may include operations, features, means, or instructions for outputting, in response to the command and the indication, the corresponding set of status information for each status register of the quantity of status registers equal to the indicated quantity, the quantity of status registers including the first status register.

In some examples of the method 500 and the apparatus described herein, each status register of the set of status registers may be associated with a respective address within an address space specific to the set of status registers, and the quantity of status registers may correspond to the first status register and one or more status registers each having an address subsequent to an address of the first status register.

In some examples of the method 500 and the apparatus described herein, the indication indicates a numeric value of a set of numeric values, and the method or apparatus further may include operations, features, means, or instructions for identifying the one or more status registers based on a mapping between the set of numeric values and the set of status registers.

In some examples of the method 500 and the apparatus described herein, the indication of the one or more status registers includes a bitmap, each bit of the bitmap corresponding to a respective status register of the set of status registers and indicating whether the memory device may be to output the corresponding status information for the respective status register.

In some examples of the method 500 and the apparatus described herein, a status register of the set of status registers corresponds to a respective portion of a memory array within the memory device, and the corresponding set of status information for the status register includes a set of bits that each indicate a different type of status information associated with the respective portion of the memory array.

In some examples of the method 500 and the apparatus described herein, each status register of at least a subset of the set of status registers may be associated with a respective plane of a memory array within the memory device.

In some examples of the method 500 and the apparatus described herein, a set of status information included in the one or more sets of status information indicates whether an operation by the memory device failed or was successfully completed, whether the memory device or a portion of the memory device may be idle or busy, temperature information for the memory device or a portion of the memory device, power or voltage information for the memory device or a portion of the memory device, or any combination thereof.

In some examples of the method 500 and the apparatus described herein, the set of status registers and a memory array within the memory device may be on a same die.

Figure 6:
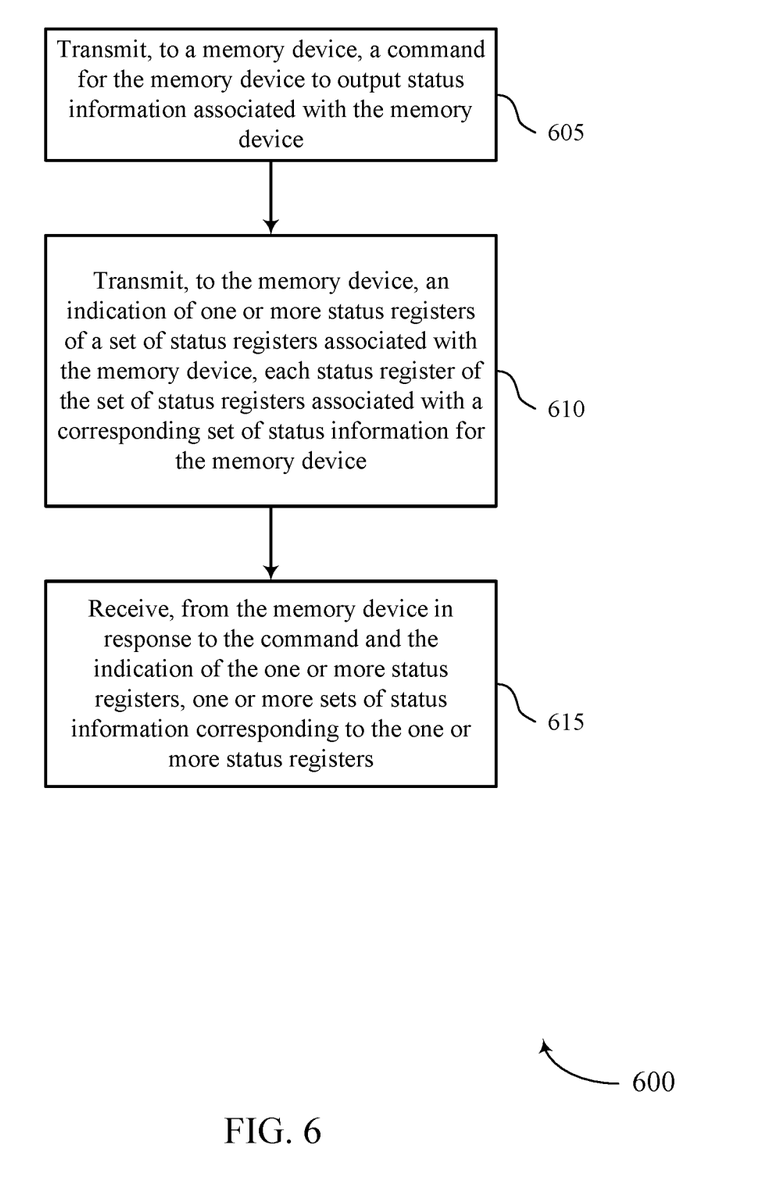

FIG. 6 shows a flowchart illustrating a method or methods 600 that supports status information retrieval for a memory device in accordance with aspects of the present disclosure. The operations of method 600 may be implemented by a host device, a mNAND controller, or the components of a host device or mNAND controller as described herein. For example, the operations of method 600 may be performed by a device as described with reference to FIG. 4. In some examples, a device (e.g., a host device and/or mNAND controller) may execute a set of instructions to control the functional elements of the device to perform the described functions. Additionally or alternatively, a device may perform aspects of the described functions using special-purpose hardware.

At 605, a command for a memory device to output status information associated with the memory device may be transmitted. The operations of 605 may be performed according to the methods described herein. In some examples, aspects of the operations of 605 may be performed by a transmission component as described with reference to FIG. 4.

At 610, an indication of one or more status registers of a set of status registers associated with the memory device may be transmitted, each status register of the set of status registers associated with a corresponding set of status information for the memory device. The operations of 610 may be performed according to the methods described herein. In some examples, aspects of the operations of 610 may be performed by a transmission component as described with reference to FIG. 4.

At 615, one or more sets of status information corresponding to the one or more status registers may be received in response to the command and the indication of the one or more status registers. The operations of 615 may be performed according to the methods described herein. In some examples, aspects of the operations of 615 may be performed by a reception component as described with reference to FIG. 4.

In some examples, an apparatus as described herein may perform a method or methods, such as the method 600. The apparatus may include features, means, or instructions (e.g., a non-transitory computer-readable medium storing instructions executable by a processor) for transmitting, to a memory device, a command for the memory device to output status information associated with the memory device, transmitting, to the memory device, an indication of one or more status registers of a set of status registers associated with the memory device, each status register of the set of status registers associated with a corresponding set of status information for the memory device, and receiving, from the memory device in response to the command and the indication of the one or more status registers, one or more sets of status information corresponding to the one or more status registers.

In some examples of the method 600 and the apparatus described herein, the indication indicates all status registers of the set of status registers, and the operations, features, means, or instructions for receiving the one or more sets of status information may include operations, features, means, or instructions for receiving corresponding sets of status information for each status register of the set of status registers in response to the command and the indication.

In some examples of the method 600 and the apparatus described herein, the indication indicates a first status register of the set of status registers and a quantity of status registers, and the operations, features, means, or instructions for receiving the one or more sets of status information may include operations, features, means, or instructions for receiving, in response to the command and the indication, the corresponding set of status information for each status register of the quantity of status registers equal to the indicated quantity, the quantity of status registers including the first status register.

In some examples of the method 600 and the apparatus described herein, each status register of the set of status registers may be associated with a respective address within an address space specific to the set of status registers, and the quantity of status registers may correspond to the first status register and one or more status registers each having an address subsequent to an address of the first status register.

Some examples of the method 600 and the apparatus described herein may further include operations, features, means, or instructions for identifying a numeric value of a set of numeric values based on a mapping between the set of numeric values and the set of status registers, where the indication of the one or more status registers includes the numeric value.

In some examples of the method 600 and the apparatus described herein, the indication of the one or more status registers includes a bitmap, each bit of the bitmap corresponding to a respective status register of the set of status registers and indicating whether the memory device may be to output the corresponding status information for the respective status register.

In some examples of the method 600 and the apparatus described herein, a set of status information included in the one or more sets of status information indicates whether an operation by the memory device failed or was successfully completed, whether the memory device or a portion of the memory device may be idle or busy, temperature information for the memory device or a portion of the memory device, power or voltage information for the memory device or a portion of the memory device, or any combination thereof.

It should be noted that the methods described above describe possible implementations, and that the operations and the steps may be rearranged or otherwise modified and that other implementations are possible. Further, portions from two or more of the methods may be combined.

An apparatus is described. The apparatus may include a set of status registers each configured to store a corresponding set of status information for a memory device and a controller for the memory device, where the controller is coupled with the status registers and configured to cause the apparatus to receive a command to output status information associated with the memory device, receive an indication of one or more status registers of the set of status registers, and output, in response to the command and the indication of the one or more status registers, one or more sets of status information corresponding to the one or more status registers.

In some examples, the indication may indicate a plurality of status registers of the set of status registers, and, to output the one or more sets of status information, the controller may be configured to cause the apparatus to output corresponding sets of status information for the set of status registers in response to the command and the indication.

In some examples, the indication may indicate all status registers of the set of status registers, and, to output the one or more sets of status information, the controller may be configured to cause the apparatus to output corresponding sets of status information for each status register of the set of status registers in response to the command and the indication.

In some examples, the indication may indicate a first status register of the set of status registers and a quantity of status registers, and, to output the one or more sets of status information, the controller may be configured to cause the apparatus to output, in response to the command and the indication, the corresponding set of status information for each status register of the quantity of status registers equal to the indicated quantity, the quantity of status registers including the first status register.

In some examples, each status register of the set of status registers may be associated with a respective address within an address space specific to the set of status registers, and the quantity of status registers may correspond to the first status register and one or more status registers each having an address subsequent to an address of the first status register.

In some examples, the indication may indicate a numeric value of a set of numeric values, and the controller may be configured to cause the apparatus to identify the one or more status registers based on a mapping between the set of numeric values and the set of status registers.

In some examples, the indication of the one or more status registers includes a bitmap, each bit of the bitmap corresponding to a respective status register of the set of status registers and indicating whether the apparatus may be to output the corresponding status information for the respective status register.

Some examples of the apparatus may include a memory array within the memory device, where a status register of the set of status registers corresponds to a respective portion of the memory array, and where the corresponding set of status information for the status register includes a set of bits that each indicate a different type of status information associated with the respective portion of the memory array.

Some examples of the apparatus may include a memory array within the memory device, where each status register of at least a subset of the set of status registers may be associated with a respective plane of the memory array.

In some examples, a set of status information included in the one or more sets of status information may indicate whether an operation by the memory device failed or was successfully completed, whether the memory device or a portion of the memory device may be idle or busy, temperature information for the memory device or a portion of the memory device, power or voltage information for the memory device or a portion of the memory device, or any combination thereof.

Some examples of the apparatus may include a memory array within the memory device, where the set of status registers, the controller, and the memory array may be on a same die.

An apparatus is described. The apparatus may include a controller for a memory device, where the controller is configured to cause the apparatus to transmit, to the memory device, a command for the memory device to output status information associated with the memory device, transmit, to the memory device, an indication of one or more status registers of a set of status registers associated with the memory device, each status register of the set of status registers associated with a corresponding set of status information for the memory device, and receive, from the memory device in response to the command and the indication of the one or more status registers, one or more sets of status information corresponding to the one or more status registers.

In some examples, the indication may indicate all status registers of the set of status registers, and, to receive the one or more sets of status information, the controller may be configured to cause the apparatus to receive corresponding sets of status information for each status register of the set of status registers in response to the command and the indication.

In some examples, the indication may indicate a first status register of the set of status registers and a quantity of status registers, and, to receive the one or more sets of status information, the controller may be configured to cause the apparatus to receive, in response to the command and the indication, the corresponding set of status information for each status register of the quantity of status registers equal to the indicated quantity, the quantity of status registers including the first status register.

In some examples, each status register of the set of status registers may be associated with a respective address within an address space specific to the set of status registers, and the quantity of status registers may correspond to the first status register and one or more status registers each having an address subsequent to an address of the first status register.

In some examples, the controller may be further configured to cause the apparatus to identify a numeric value of a set of numeric values based on a mapping between the set of numeric values and the set of status registers, where the indication of the one or more status registers includes the numeric value.

In some examples, the indication of the one or more status registers includes a bitmap, each bit of the bitmap corresponding to a respective status register of the set of status registers and indicating whether the apparatus may be to output the corresponding status information for the respective status register.

In some examples, the memory device may be on a first die within the apparatus, and the controller may be on a second die within the apparatus.

In some examples, the controller may be coupled with the memory device via a first interface, the controller may be configured to be coupled with a host device for the memory device via a second interface, and the controller may be configured to receive commands for the memory device from the host device via the second interface.

In some examples, a set of status information included in the one or more sets of status information indicates whether an operation by the memory device failed or was successfully completed, whether the memory device or a portion of the memory device may be idle or busy, temperature information for the memory device or a portion of the memory device, power or voltage information for the memory device or a portion of the memory device, or any combination thereof.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive.

A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus, comprising:
   a set of status registers each configured to store a corresponding set of status information for a memory device; and a controller for the memory device, wherein the controller is coupled with the set of status registers and configured to cause the apparatus to:
receive a command, on a bus at a first time period, to output status information associated with the memory device;
receive an indication, on the bus at a second time period different from the first time period, of one or more status registers of the set of status registers, wherein the indication indicates a first status register of the set of status registers and a value indicative of a quantity of status registers of the set of status registers; and
output, on the bus and in response to the command and the indication of the one or more status registers, one or more sets of status information corresponding to the one or more status registers in a single burst.

2. The apparatus of claim 1, wherein the indication indicates a plurality of status registers of the set of status registers, and wherein, to output the one or more sets of status information, the controller is configured to cause the apparatus to:
output corresponding sets of status information for the plurality of status registers in response to the command and the indication.

3. The apparatus of claim 1, wherein the indication indicates all status registers of the set of status registers, and wherein, to output the one or more sets of status information, the controller is configured to cause the apparatus to:
output corresponding sets of status information for each status register of the set of status registers in response to the command and the indication.

4. The apparatus of claim 1, wherein, to output the one or more sets of status information, the controller is configured to cause the apparatus to:
output, in response to the command and the indication, the corresponding set of status information for each status register of the quantity of status registers equal to the indicated quantity, the quantity of status registers including the first status register.

5. The apparatus of claim 4, wherein each status register of the set of status registers is associated with a respective address within an address space specific to the set of status registers, and wherein the quantity of status registers corresponds to the first status register and one or more status registers each having an address subsequent to an address of the first status register.

6. The apparatus of claim 1, wherein the indication indicates a numeric value of a set of numeric values, and wherein the controller is configured to cause the apparatus to:
identify the one or more status registers based at least in part on a mapping between the set of numeric values and the set of status registers.

7. The apparatus of claim 1, wherein the indication of the one or more status registers comprises a bitmap, each bit of the bitmap corresponding to a respective status register of the set of status registers and indicating whether the apparatus is to output the corresponding status information for the respective status register.

8. The apparatus of claim 1, further comprising:
a memory array within the memory device, wherein a status register of the set of status registers corresponds to a respective portion of the memory array, and wherein the corresponding set of status information for the status register comprises a plurality of bits that each indicate a different type of status information associated with the respective portion of the memory array.

9. The apparatus of claim 1, further comprising:
a memory array within the memory device, wherein each status register of at least a subset of the set of status registers is associated with a respective plane of the memory array.

10. The apparatus of claim 1, wherein a set of status information included in the one or more sets of status information indicates whether an operation by the memory device failed or was successfully completed, whether the memory device or a portion of the memory device is idle or busy, temperature information for the memory device or a portion of the memory device, power or voltage information for the memory device or a portion of the memory device, or any combination thereof.

11. The apparatus of claim 1, further comprising:
a memory array within the memory device, wherein the set of status registers, the controller, and the memory array are on a same die.

12. An apparatus, comprising:
a memory device; and
a controller for the memory device, wherein the controller is configured to cause the apparatus to:
transmit, to the memory device on a bus at a first time period, a command for the memory device to output status information associated with the memory device;
transmit, to the memory device on the bus at a second time period different from the first time period, an indication of one or more status registers of a set of status registers associated with the memory device, each status register of the set of status registers associated with a corresponding set of status information for the memory device, wherein the indication indicates a first status register of the set of status registers and a value indicative of a quantity of status registers of the set of status registers; and
receive, from the memory device on the bus and in response to the command and the indication of the one or more status registers, one or more sets of status information corresponding to the one or more status registers in a single burst.

13. The apparatus of claim 12, wherein the indication indicates all status registers of the set of status registers, and wherein, to receive the one or more sets of status information, the controller is configured to cause the apparatus to:
receive corresponding sets of status information for each status register of the set of status registers in response to the command and the indication.

14. The apparatus of claim 12, wherein, to receive the one or more sets of status information, the controller is configured to cause the apparatus to:
receive, in response to the command and the indication, the corresponding set of status information for each status register of the quantity of status registers equal to the indicated quantity, the quantity of status registers including the first status register.

15. The apparatus of claim 14, wherein each status register of the set of status registers is associated with a respective address within an address space specific to the set of status registers, and wherein the quantity of status registers corresponds to the first status register and one or more status registers each having an address subsequent to an address of the first status register.

16. The apparatus of claim 12, wherein the controller is further configured to cause the apparatus to:
identify a numeric value of a set of numeric values based at least in part on a mapping between the set of numeric values and the set of status registers, wherein the indication of the one or more status registers comprises the numeric value.

17. The apparatus of claim 12, wherein the indication of the one or more status registers comprises a bitmap, each bit of the bitmap corresponding to a respective status register of the set of status registers and indicating whether the apparatus is to output the corresponding status information for the respective status register.

18. The apparatus of claim 12, wherein:
the memory device is on a first die within the apparatus; and
the controller is on a second die within the apparatus.

19. The apparatus of claim 18, wherein:
the controller is coupled with the memory device via a first interface;
the controller is configured to be coupled with a host device for the memory device via a second interface; and
the controller is configured to receive commands for the memory device from the host device via the second interface.

20. The apparatus of claim 12, wherein a set of status information included in the one or more sets of status information indicates whether an operation by the memory device failed or was successfully completed, whether the memory device or a portion of the memory device is idle or busy, temperature information for the memory device or a portion of the memory device, power or voltage information for the memory device or a portion of the memory device, or any combination thereof.

21. A non-transitory computer-readable medium storing code comprising instructions which, when executed by a processor of an electronic device, cause the electronic device to:
receive a command, on a bus at a first time period, to output status information associated with a memory device, wherein the memory device comprises a set of status registers each configured to store a corresponding set of status information for the memory device;
receive an indication, on the bus at a second time period different from the first time period, of one or more status registers of the set of status registers, wherein the indication indicates a first status register of the set of status registers and a value indicative of a quantity of status registers of the set of status registers; and
output, on the bus and in response to the command and the indication of the one or more status registers, one or more sets of status information corresponding to the one or more status registers in a single burst.

22. The non-transitory computer-readable medium of claim 21, wherein the indication indicates all status registers of the set of status registers, and wherein the instructions to output the one or more sets of status information cause the electronic device to:
output corresponding sets of status information for each status register of the set of status registers in response to the command and the indication.

23. The non-transitory computer-readable medium of claim 21, wherein the instructions to output the one or more sets of status information cause the electronic device to:
output, in response to the command and the indication, the corresponding set of status information for each status register of the quantity of status registers equal to the indicated quantity, the quantity of status registers including the first status register.

24. A non-transitory computer-readable medium storing code comprising instructions which, when executed by a processor of an electronic device, cause the electronic device to:
transmit, to a memory device on a bus at a first time period, a command for the memory device to output status information associated with the memory device;
transmit, to the memory device on the bus at a second time period different from the first time period, an indication of one or more status registers of a set of status registers associated with the memory device, each status register of the set of status registers associated with a corresponding set of status information for the memory device, wherein the indication indicates a first status register of the set of status registers and a value indicative of a quantity of status registers of the set of status registers; and
receive, from the memory device on the bus and in response to the command and the indication of the one or more status registers, one or more sets of status information corresponding to the one or more status registers in a single burst.

25. The non-transitory computer-readable medium of claim 24, wherein the indication indicates all status registers of the set of status registers, and wherein the instructions that to receive the one or more sets of status information cause the electronic device to:
receive corresponding sets of status information for each status register of the set of status registers in response to the command and the indication.

* * * * *